Feb. 22, 1955　　　G. O. HILLARD, JR　　　2,702,742
APPARATUS FOR CONTACTING SOLIDS AND VAPORS
Filed Nov. 14, 1950　　　　　　　　　　　　3 Sheets-Sheet 1

George O. Hillard, Jr. Inventor
By W. O. Heilman Attorney

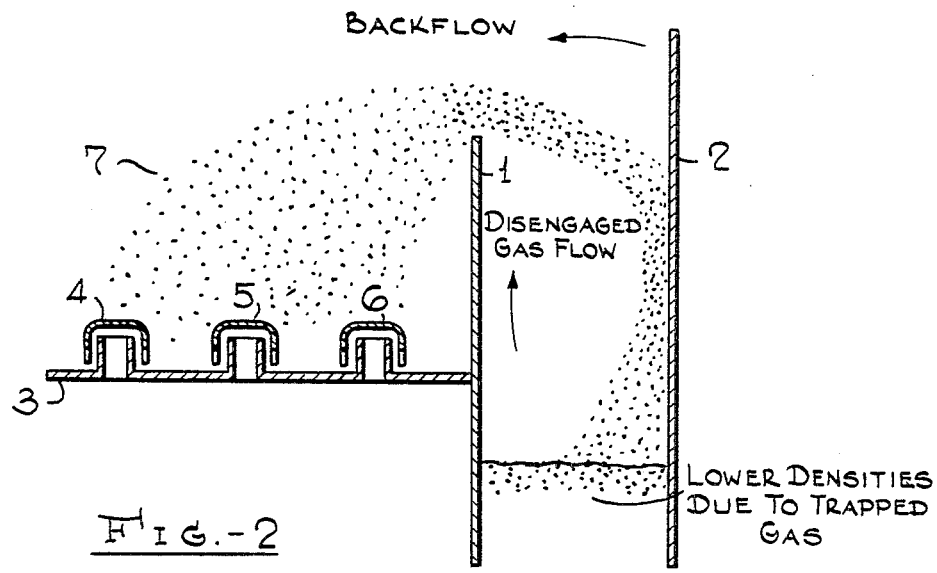
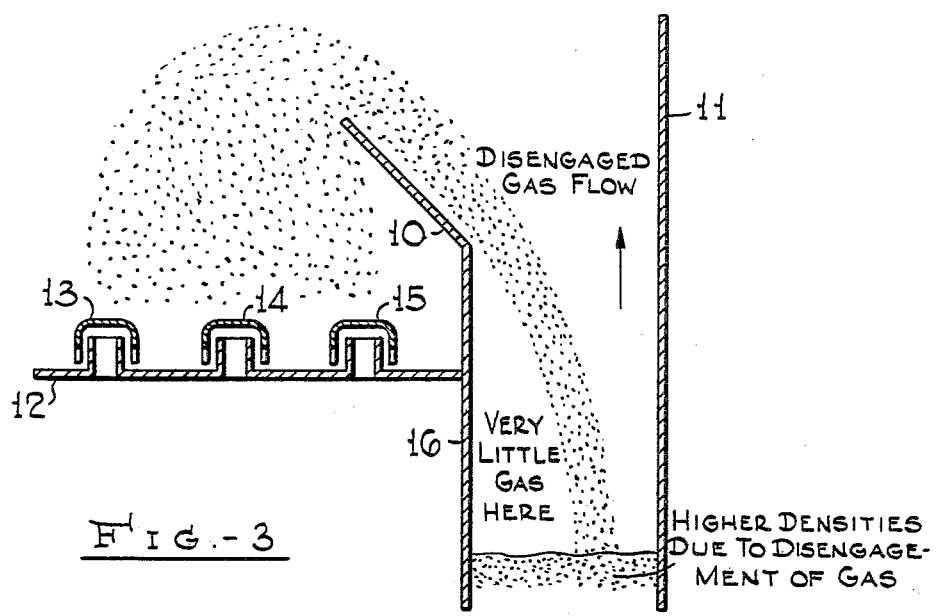

United States Patent Office 2,702,742
Patented Feb. 22, 1955

2,702,742

APPARATUS FOR CONTACTING SOLIDS AND VAPORS

George O. Hillard, Jr., Baton Rouge, La., assignor to Standard Oil Development Company, a corporation of Delaware Application November 14, 1950, Serial No. 195,677

4 Claims. (Cl. 23—288)

The present invention is concerned wth an improved method and apparatus for contacting vapors with fluidized, finely divided solid particles. The invention is more particularly concerned with a method and apparatus for contacting fluidized solid particles and vapors in a series of superimposed contact chambers or zones in a contacting vessel, wherein the fluidized solid particles are passed downwardly in countercurrent relationship to the ascending vapors or gases. In accordance with the present invention, vapors or gases are passed through a reaction zone or vessel in a direction countercurrent to the flow of finely divided fluidized contacting materials. The vapors are passed upwardly through the reaction zone and the finely divided solid particles are passed downwardly under conditions wherein the velocity of upflowing vapor or gas is so adjusted that the solid particles are fluidized and simulate a liquid. In accordance with the present invention, the weir of the downcomer for the respective superimposed contact chambers is slanted in order to improve the fluidized solid flow between the respective chambers.

It is well known in the art to conduct various reactions employing fluidized solid particles wherein gases and vapors are contacted with the same. In these reactions, the solid particles are maintained in a fluidized state by the velocity of upflowing gases which for example is normally in the range of from about 0.5 to 3 ft. per second. The size of the catalyst particles is usually below about 200 microns. Usually, at least 50% of the catalyst has a micron size in the range from about 20—80. In fluidized solid operations of this character, it is also known to use bubble cap trays wherein the upflowing gases move from one zone to another through bubble caps or their equivalent into a dense bed of fluidized solids disposed immediately above the respective trays. These solids flow across the tray and across a weir into a downcomer and pass into the zone below. The height of the dense bed or phase above the respective tray is determined by the weir height. While operations of this sort have been entirely satisfactory, one disadvantage is that an entrapment of the gas occurs in the downcomer causing back flow and turbulence. In the operation wherein fluidized solids flow across bubble cap plates, the velocity of the solids across the top of a normal vertical weir is such that the solids strike the back of the downcomer while only a few inches below the weir. This results in considerable gas being trapped in the downcomer. Some gas passes back through the overflowing solids causing interference with this flow; back flow across vapor space above the plate and considerable turbulence. The trapped gas in the dense phase in the downcomer also results in a lower density in the downcomer and necessitates a greater plate spacing than if higher densities are obtained. In accordance with the present invention, by slanting the weir from the vertical, improved disengaging of gas is obtained; higher solid throughputs are secured and general improvements in overall operations result.

The invention and its objects may be more fully understood from the following description when read in conjunction with the accompanying drawings.

Figure 2 illustrates a conventional weir, while Figures 3 and 4 illustrate the weirs to be employed in accordance with the present invention.

Figure 1:
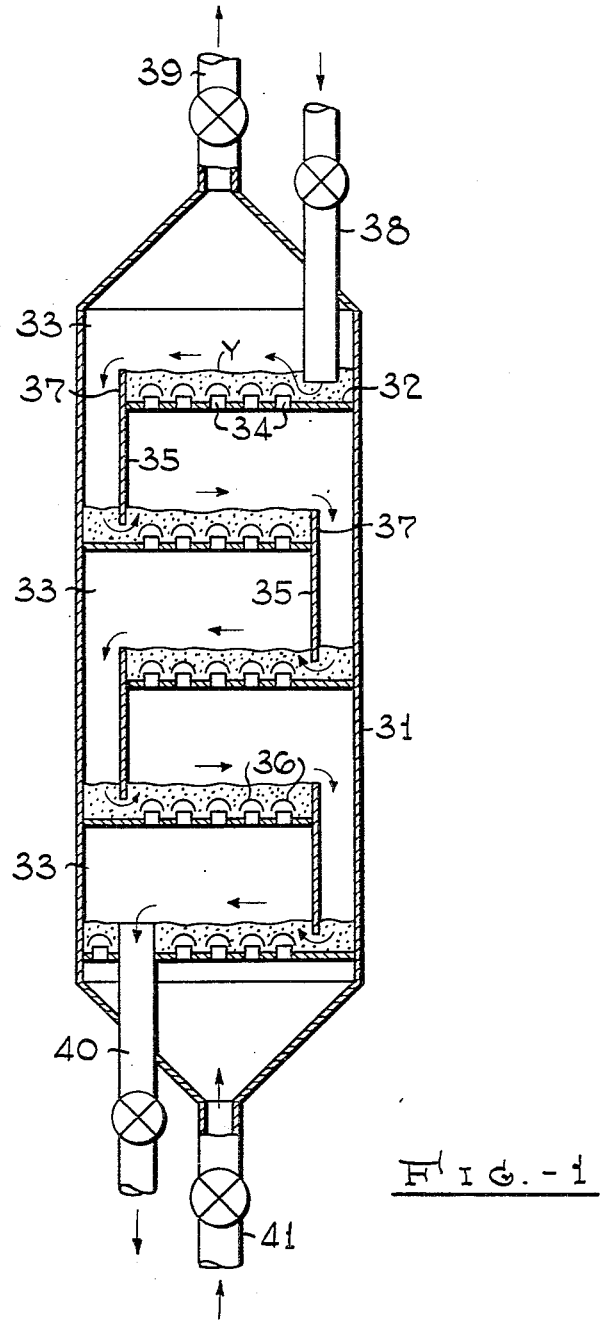
Figure 1 is a semi-diagrammatic illustration showing a typical fluidized solids contacting vessel in vertical section.

Referring specifically to Figure 1, the numeral 31 designates a fluidized solids bubble tray column, contacting vessel. The vessel 31 is conventionally provided with a series of vertically spaced, transverse, perforated plate elements 32, forming a vertical series of superimposed, contact chambers or zones. These chambers or zones are in communication one with another by way of the passageways 34 formed by the plate perforations, and downcomers 35 disposed at alternate sides of the vessel from plate to plate. The downcomers extend from the surface of one plate downwardly into vertically spaced relation to the surface of the plate next below. As shown in Figure 1, the passageways 34 through the plate are each provided with bubble cap elements 36. In addition, each plate 32 is provided with a weir member 37, at the entrance to the downcomer 35, extending upwardly from the plate surface to a level above the lower end of the downcomer from the plate next above. The vessel is also provided with an inlet pipe 38 for fluidized solid material extending into the upper end of the vessel, and terminating in spaced relation to the uppermost plate 32, below the upper end of the weir 37 for that plate. An outlet from the vessel for gaseous materials is provided as by conduit 39. At the lower end of the vessel is an outlet 30 for finely divided solid materials, and an inlet 41 for gaseous materials to be passed through the vessel.

Referring specifically to Figure 2, a fluidized solids operation is shown wherein a conventional vertical weir 1 is illustrated disposed in zone 2. A bubble cap plate 3 is shown containing bubble caps 4, 5 and 6. The upflowing gases pass from the zone below upwardly through chimneys on plate 3 and downwardly in the area between the outer surface of the chimneys and the inner surface of the bubble caps. These upflowing gases pass through slots in the lower end of the chimney into a dense phase of fluidized particles 7 on the top of plate 3. The height of the dense phase of the fluidized solids is determined by the height of the weir 1. The fluidized solids pass over the top of the weir into the downcomer and pass into the zone below. As shown, the particles strike the opposite side of the downcomer resulting in the entrapment of gas in a large area of the downcomer.

Referring specifically to Figure 3, a slanted weir of the present invention is illustrated. Upflowing gases from the zone below pass through chimneys on plate 12 and into the dense phase above plate 12 through bubble caps 13, 14 and 15. The height of the dense phase is maintained by weir 10. However, by slanting the weir as illustrated, the downflowing fluidized solid particles entrap very little gas in the downcomer.

Figure 4:
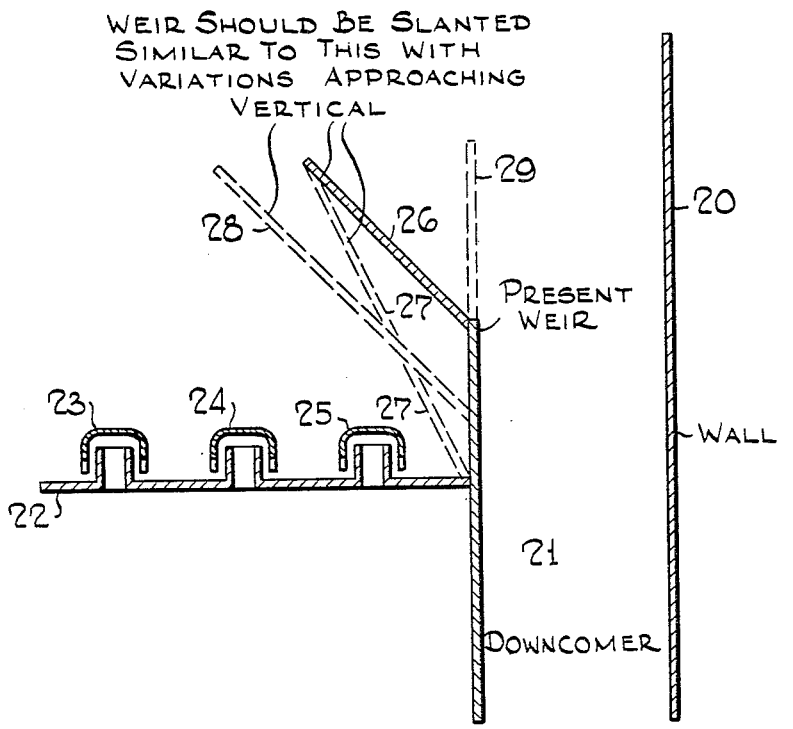

Various modifications of the slanted weir are illustrated in Figure 4. Upflowing gases pass through chimneys on plate 22 through bubble caps 23, 24 and 25 into a dense phase maintained on top of plate 22. The conventional weir 29 is shown while the slanted weir 26, as discussed with respect to Figure 3 is also illustrated. Numerals 27 and 28 illustrate further modifications of the slanted weir of the present invention.

The present invention is broadly concerned with increasing the efficiency of fluidized solids contacting zones wherein bubble cap trays or their equivalent are utilized. The improvement is secured by preventing interference with the nappe of the fluidized solids flowing over the weir. One method of doing this when using a conventional vertical weir is to increase the distance between the weir and the wall of the contacting zone. However, this greatly increases the size of the contacting zone for a fixed throughput. In accordance with the present invention, interference with the nappe of the solids flowing over the weir is substantially reduced by employing a slanted weir.

The character of the slanted weir may be varied appreciably but in all instances it is slanted inwardly into the dense phase. In general, it is preferred that the vertical height of the weir be from one-third to two-thirds of the height of the dense phase desired above the tray or plate. Thus, for example if the height of the dense phase desired is 12 inches, it is preferred that the vertical height of the weir be from 4 to 8 inches, preferably about 6 inches. It is also preferred that the upper height of the weir slant inwardly at an angle of from 30 to 60° preferably about 45° and have a length sufficient to maintain the dense phase at for example 12 inches.

Having described the invention it is claimed:

1. In an apparatus for contacting gaseous fluids with finely divided solid materials, including a vertically disposed cylindrical contacting vessel; a vertical series of spaced superimposed trays transversely of said vessel, of which each tray has an open segment adjacent the vessel wall; and a plate member attached to each tray open segment edge extending laterally thereof into edgewise engagement with the vessel wall at opposite ends of said segment edge, each plate member having a first portion dependent from a tray open segment edge into spaced relation at its lower end to the tray next below, said first portion defining a downcomer passage with the vessel wall; the improvement which comprises a weir at the entrance to said downcomer passage, constituted by a second portion of said plate member, which second portion extends upwardly from said tray segment edge to an upper terminal edge disposed in vertically spaced relation above said tray at a level intermediate the tray next above and the lower end of the first plate portion dependent from said tray next above, and of which second plate portion at least that section which includes and adjoins said upper terminal edge is inclined inwardly of said vessel at an angle of from about 30° to about 60° relative to said tray to which said second portion is attached, the vertical height of said inclined section being at least one-third of the total distance between said tray and the upper terminal edge of said second plate portion.

2. An apparatus according to claim 1 wherein that section which includes and immediately adjoins the upper terminal edge of said second plate portion is inclined at an angle of about 45° relative to said tray to which said second portion is attached.

3. An apparatus according to claim 1 in which the entire second plate portion is inclined inwardly of the vessel from the segment edge of said tray to which said second plate portion is attached to the upper terminal edge of said second plate portion.

4. An apparatus according to claim 1 wherein said section of said second plate portion which includes and adjoins said upper terminal edge is inclined inwardly of said vessel from a level above the tray to which said second plate portion is attached, which level is vertically spaced from said tray at a distance equal to from about one-third to about two-thirds of the vertical distance between said tray and the upper terminal edge of said second plate portion.

References Cited in the file of this patent

UNITED STATES PATENTS

| | | |
|---|---|---|
| 1,116,322 | Pampe | Nov. 3, 1914 |
| 2,020,009 | Zeitler | Nov. 5, 1935 |
| 2,254,370 | Kaplan | Sept. 2, 1941 |
| 2,425,098 | Kassel | Aug. 5, 1947 |
| 2,444,289 | Gorin | June 29, 1948 |
| 2,444,990 | Hemminger | July 13, 1948 |
| 2,456,707 | Keith | Dec. 21, 1948 |
| 2,487,984 | Rodman | Nov. 15, 1949 |
| 2,503,788 | White | Apr. 11, 1950 |
| 2,510,444 | Watson | June 6, 1950 |